United States Patent
Balasundaram et al.

(10) Patent No.: US 9,541,993 B2
(45) Date of Patent: Jan. 10, 2017

(54) MOBILE DEVICE OPERATION USING GRIP INTENSITY

(75) Inventors: Sai Prasad Balasundaram, Beaverton, OR (US); David Graumann, Portland, OR (US); Giuseppe Raffa, Portland, OR (US); Sangita Sharma, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 20 days.

(21) Appl. No.: 13/997,160

(22) PCT Filed: Dec. 30, 2011

(86) PCT No.: PCT/US2011/068221
§ 371 (c)(1),
(2), (4) Date: Jun. 21, 2013

(87) PCT Pub. No.: WO2013/101220
PCT Pub. Date: Jul. 4, 2013

(65) Prior Publication Data
US 2013/0335319 A1 Dec. 19, 2013

(51) Int. Cl.
*G09G 5/00* (2006.01)
*G06F 3/01* (2006.01)
(Continued)

(52) U.S. Cl.
CPC ........... *G06F 3/011* (2013.01); *G06F 3/03547* (2013.01); *G06F 3/0485* (2013.01); *G06F 3/0488* (2013.01);
(Continued)

(58) Field of Classification Search
CPC .... G06F 3/011; G06F 3/03547; G06F 3/0485; G06F 3/0488; G06F 2203/0339; H04M 1/72522; H04M 2250/22
(Continued)

(56) References Cited

U.S. PATENT DOCUMENTS 6,630,922 B2 * 10/2003 Fishkin et al. ............... 345/156
7,561,146 B1 7/2009 Hotelling
(Continued)

FOREIGN PATENT DOCUMENTS

JP 2004-177993 6/2004
JP 2006146936 6/2006
(Continued)

OTHER PUBLICATIONS

International Search Report and Written Opinion of the International Searching Authority dated May 17, 2012, in International Patent Application No. PCT/US11/54360, 10 pages.
(Continued)

*Primary Examiner* — Lixi C Simpson
*Assistant Examiner* — Ngan T Pham Lu
(74) *Attorney, Agent, or Firm* — Blakely, Sokoloff, Taylor & Zafman LLP

(57) ABSTRACT

Mobile device operation using grip intensity. An embodiment of a mobile device includes a touch sensor to detect contact or proximity by a user of the mobile device; a memory to store indicators of grip intensity in relation to the touch sensor; and a processor to evaluate contact to the touch sensor. The processor is to compare a contact with the touch sensor to the indicators of grip shape and firmness to determine grip intensity, and the mobile device is to receive an input for a function of the mobile device based at least in part on determined grip intensity for the mobile device.

22 Claims, 10 Drawing Sheets

(51) Int. Cl.
  *G06F 3/0488* (2013.01)
  *G06F 3/0485* (2013.01)
  *G06F 3/0354* (2013.01)
  *H04M 1/725* (2006.01)

(52) U.S. Cl.
  CPC .. *G06F 2203/0339* (2013.01); *H04M 1/72522* (2013.01); *H04M 2250/22* (2013.01)

(58) Field of Classification Search
  USPC .......................................................... 345/156
  See application file for complete search history.

(56) References Cited

U.S. PATENT DOCUMENTS

| | | | |
|---|---|---|---|
| 8,055,305 B2* | 11/2011 | Cho et al. ..................... | 455/566 |
| 2003/0043174 A1 | 3/2003 | Hinckley et al. | |
| 2006/0044259 A1 | 3/2006 | Hotelling et al. | |
| 2009/0225044 A1 | 9/2009 | Jeon et al. | |
| 2010/0085317 A1* | 4/2010 | Park ....................... | G06F 1/1626 345/173 |
| 2010/0151916 A1* | 6/2010 | Baek et al. .................. | 455/567 |
| 2010/0315337 A1 | 12/2010 | Ferren et al. | |
| 2010/0315356 A1 | 12/2010 | Ferren et al. | |
| 2011/0069024 A1* | 3/2011 | Kim ......................... | G06F 3/01 345/173 |
| 2011/0312349 A1* | 12/2011 | Forutanpour ......... | G06F 1/1626 455/466 |
| 2012/0158629 A1 | 6/2012 | Hinckley et al. | |
| 2012/0182238 A1 | 7/2012 | Lee | |
| 2013/0050133 A1 | 2/2013 | Brakensiek et al. | |
| 2013/0069911 A1 | 3/2013 | You | |

FOREIGN PATENT DOCUMENTS

| | | |
|---|---|---|
| JP | 2007036752 | 2/2007 |
| JP | 2008-052062 | 3/2008 |
| JP | 2008052062 | 3/2008 |
| JP | 2008-511077 | 4/2008 |
| JP | 2008511077 | 4/2008 |
| JP | 2008532185 | 8/2008 |
| JP | 2009-169820 | 7/2009 |
| JP | 2009169820 | 7/2009 |
| JP | 2010-026638 | 2/2010 |
| JP | 2010026638 | 4/2010 |
| JP | 2010-213169 | 9/2010 |
| JP | 20100213169 | 9/2010 |
| JP | 2011039093 | 2/2011 |
| JP | 2011100486 | 5/2011 |
| KR | 10-2007-0071917 | 7/2007 |
| KR | 10-2009-0026977 | 3/2009 |
| WO | WO2011101940 | 8/2011 |

OTHER PUBLICATIONS

International Search Report and Written Opinion of the International Searching Authority dated Oct. 4, 2012, in International Patent Application No. PCT/US2011/068221, 11 pages.

Kee Eung Kim et al., "Recognition of Grip Patterns by Using Capacitive Touch Sensors," Industrial Electronics, IEEE ISIE 2006, vol. 4, Jul. 9-13, 2006, pp. 2936-2941.

Notice of Reasons for Rejection dated Feb. 24, 2015 (+ English translation), in Japanese Patent Application No. 2014-533272, 6 pages.

Office Action mailed Mar. 11, 2015, in U.S. Appl. No. 13/995,459, 8 pages.

Final Office Action mailed Jun. 26, 2015, in U.S. Appl. No. 13/995,459, 8 pages.

Notice of Reasons for Rejection mailed Aug. 25, 2015 (+ English translation), in Japanese Patent Application No. 2014-533272, 6 pages.

Japanese Patent Application No. 2014-533272 Decision to Grant, Issued Mar. 1, 2016, 3 pages.

* cited by examiner

MOBILE DEVICE OPERATION USING GRIP INTENSITY

TECHNICAL FIELD

Embodiments of the invention generally relate to the field of electronic devices and, more particularly, to mobile device operation using grip intensity.

BACKGROUND

Mobile devices, including cellular phones, smart phones, mobile Internet devices (MIDs), handheld computers, personal digital assistants (PDAs), and other similar devices, may include one more touch sensors for operation to allow entry of inputs to the mobile device.

Such a mobile device will commonly be grasped in a hand for operation. In many circumstances, the holding of the device will be followed by an input into one or more applications or services, or reading information from the screen of the mobile device.

A mobile device may be of a size and shape to allow grasping around the device. However, such a grasp limits the types of input that may be made into the application because the hand that is holding the mobile device is limited by the need to grip and stabilize the mobile device during operation.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
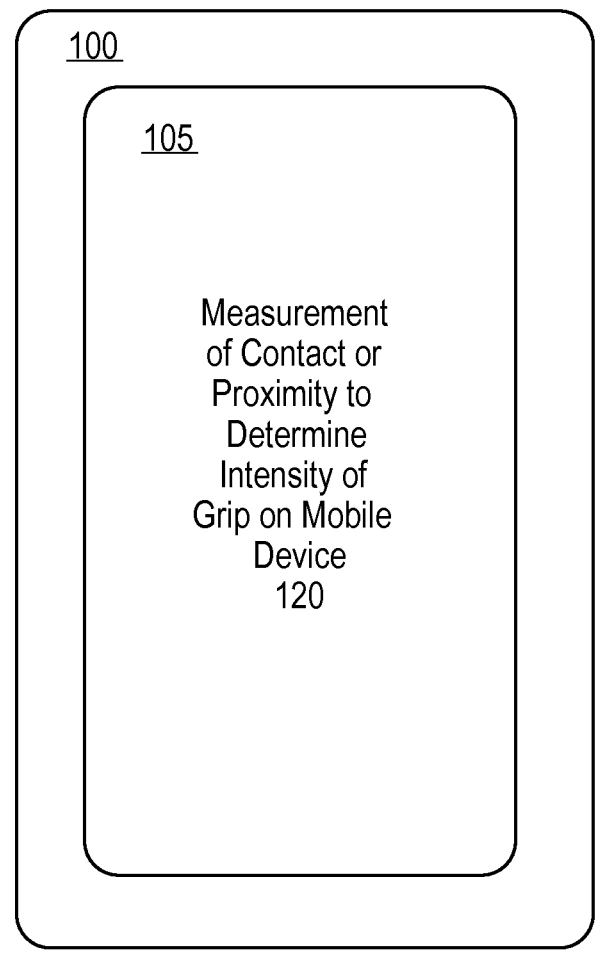
FIG. 1 is an illustration of mobile device providing for control using determination of grip intensity.

Embodiments of the invention are generally directed to mobile device operation using grip intensity.

As used herein:

"Mobile device" means a mobile electronic device or system including a cellular phone, smart phone, mobile Internet device (MID), handheld computers, tablet computer, personal digital assistants (PDAs), and other similar devices.

"Touch sensor" means a sensor that is configured to provide input signals that are generated by the physical contact of a user, proximity of a user, or both (which may generally be referred to as contact with the touch sensor), including a sensor that detects contact by a thumb or other finger of a user of a device or system, including a mobile device. A touch sensor may include, but is not limited to, a capacitive sensor, which may detect the contact of a finger or hand on the capacitive sensor, including a capacitive touch screen. A touch sensor may include a sensor used for multiple different purposes in the operation of a device or system.

"Side touch sensor" means a touch sensor that detects contact of a user, including a user's finger or hand, on at least one side of a device or system including a mobile device. A side touch sensor includes a touch sensor that is physically located at least in part on at least one side of the mobile device, or a side touch sensor that detects contact with a user on the side of the mobile device without being physically located on the side on the mobile device.

In some embodiments, a mobile device provides for input using grip intensity, where grip intensity indicates a tightness of grip or amount of force used by the user in grasping the mobile device. In some embodiments, the mobile device detects surface area contact by a user, and utilizes such data to determine or estimate grip intensity.

In some embodiments, a mobile device does not include a sensor to determine pressure or to otherwise directly detect grip intensity. In some embodiments, the mobile device determines grip intensity indirectly using one or more touch sensors, where the touch sensors may include a touch screen.

In some embodiments, an apparatus, system, or method provides for input for a mobile device function using determined grip intensity of a user.

In some embodiments, a mobile device, such as a smart phone, uses grip intensity as an input modality for applications running on the mobile device. Grip intensity may provide a more natural input modality than conventional input forms for certain usages of a mobile device, such as scrolling text on the screen. Conventional mobile devices and methods may provide an interaction for scrolling text to the next/previous page that involves, for example, gripping the mobile device and flicking the thumb on the screen upwards or downwards. Autoscrolling (used in teleprompters. for example) may be used to eliminate the need for the user to manually page through a document. However, with a conventional device or method, there is no reliable or intuitive way to control the speed of scrolling. In some embodiments, an apparatus, system or method addresses speed of scrolling, or other similar function by determining grip intensity and using this to control the speed of scrolling.

In some embodiments, an apparatus, system, or method determines grip intensity by using touch sensors, such as existing touch sensors on a device's touch screen. In some embodiments, a mobile device may provide for determination of grip intensity without requiring, for example, additional side touch sensors or other such sensors. In some embodiments, an apparatus, system, or method using a user's hand's contact with and proximity with a touch sensor of a mobile device to determine the intensity of the user's grip.

While grip intensity is useful for controlling scrolling speed, embodiments are not limited to this particular implementation. In some embodiments, in addition to scrolling speed, grip intensity may be applied to other aspects of the operation of a mobile device, such as a smart phone, in a similar analog fashion. In some embodiments, grip intensity may be utilized to adjust device characteristics such as adjusting screen brightness (for example increasing brightness with increasing grip intensity, speeding up an application's execution time or execution priority, or manipulating a camera's zoom (zooming in and out of an image based on grip intensity).

In some embodiments, a function may be activated or deactivated based on a determination of grip intensity, such as a first squeeze by the user operating to activate a first function and a second squeeze operating to deactivate the first function. In one example, a mobile device may include a backlight, and a function may operate to intensify the backlight, such as when the mobile device is used as a flashlight. In this example, the mobile device may thus provide for activating the bright backlight with a first squeeze of the mobile device and deactivating the bright backlight with a second squeeze of the mobile device. However, embodiments are not limited to a single function, and may operate to, for example, rotate activation of a number of functions or modes with successive squeezes of the mobile device, such as activating a first function with a first squeeze, activating a second function with a second squeeze, and so on.

FIG. 1 is an illustration of mobile device providing for control using determination of grip intensity. In some embodiments, a mobile device 100 includes a touch screen 105, where the touch screen detects contact or proximity of a user's hands, such as using capacitive detection. In some embodiments, the mobile device 100 uses contact or proximity of a user's hand and fingers with the touch screen 105 to determine an intensity of a user's grip on the mobile devices 120. In some embodiments, the mobile device 100 may use the determined grip intensity as an input for one or more operations of the mobile device 100.

Figure 2:
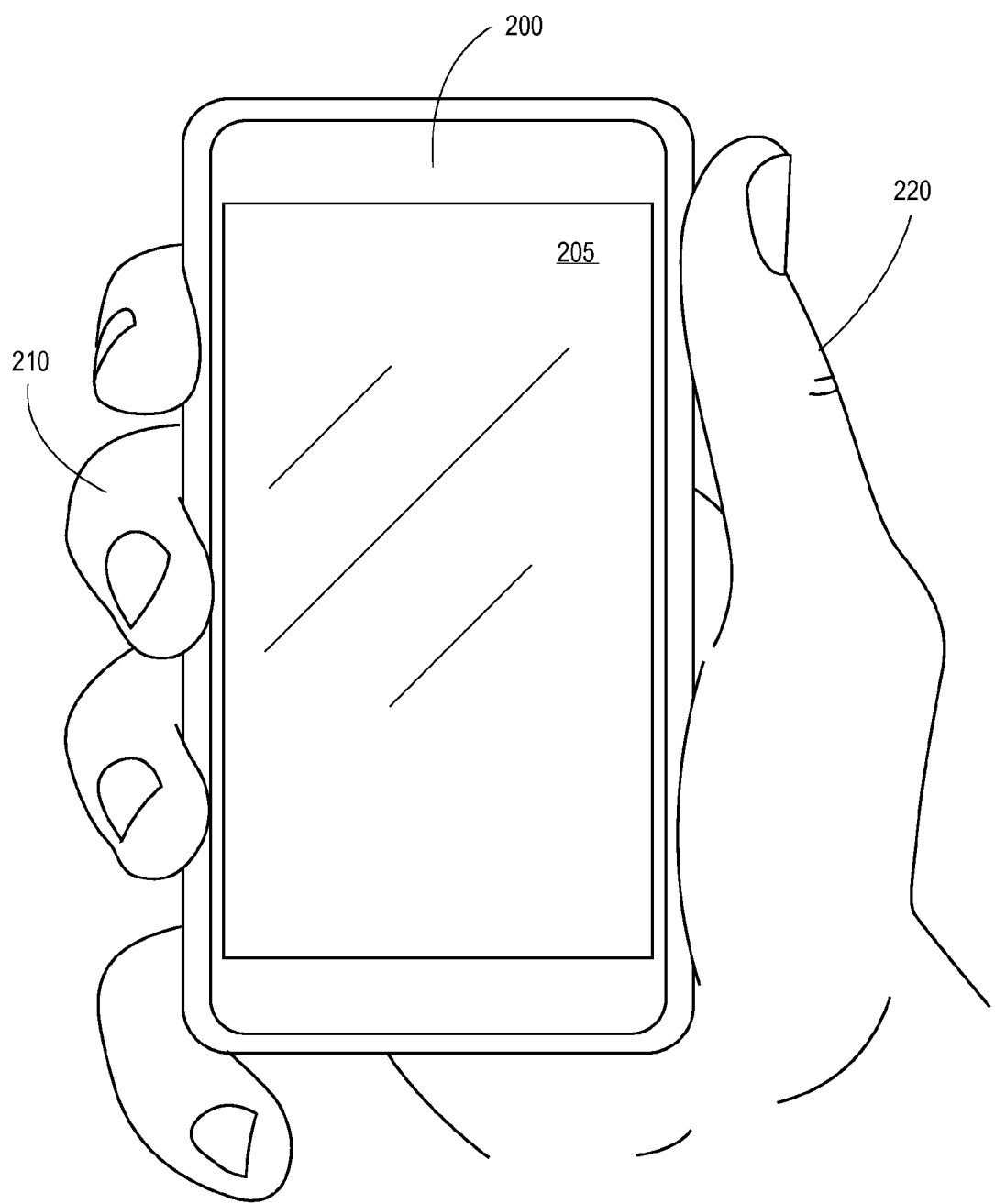
FIG. 2 illustrates low intensity gripping of an embodiment of a mobile device.

FIG. 2 illustrates low intensity gripping of an embodiment of a mobile device. In this illustration, the grip may be indicative of a user holding the mobile device to stabilize the mobile device for use, and not intended to tightly grip the device. In some embodiments, a mobile device 200 including a touch screen 205 may be gripped loosely by the hand and fingers of a user, where the loose grip may include some finger wrapping 210 on a first side (the left side in this illustration) of the mobile device 200 and a relatedly loose contact with the thumb and hand 220 on a second side (the right side in this illustration) of the mobile device. With this loose grip, the touch screen 205 of the mobile device 200 will detect only limited contact and proximity with the user's hand, thereby providing a first level of input to the mobile device 200.

Figure 3:
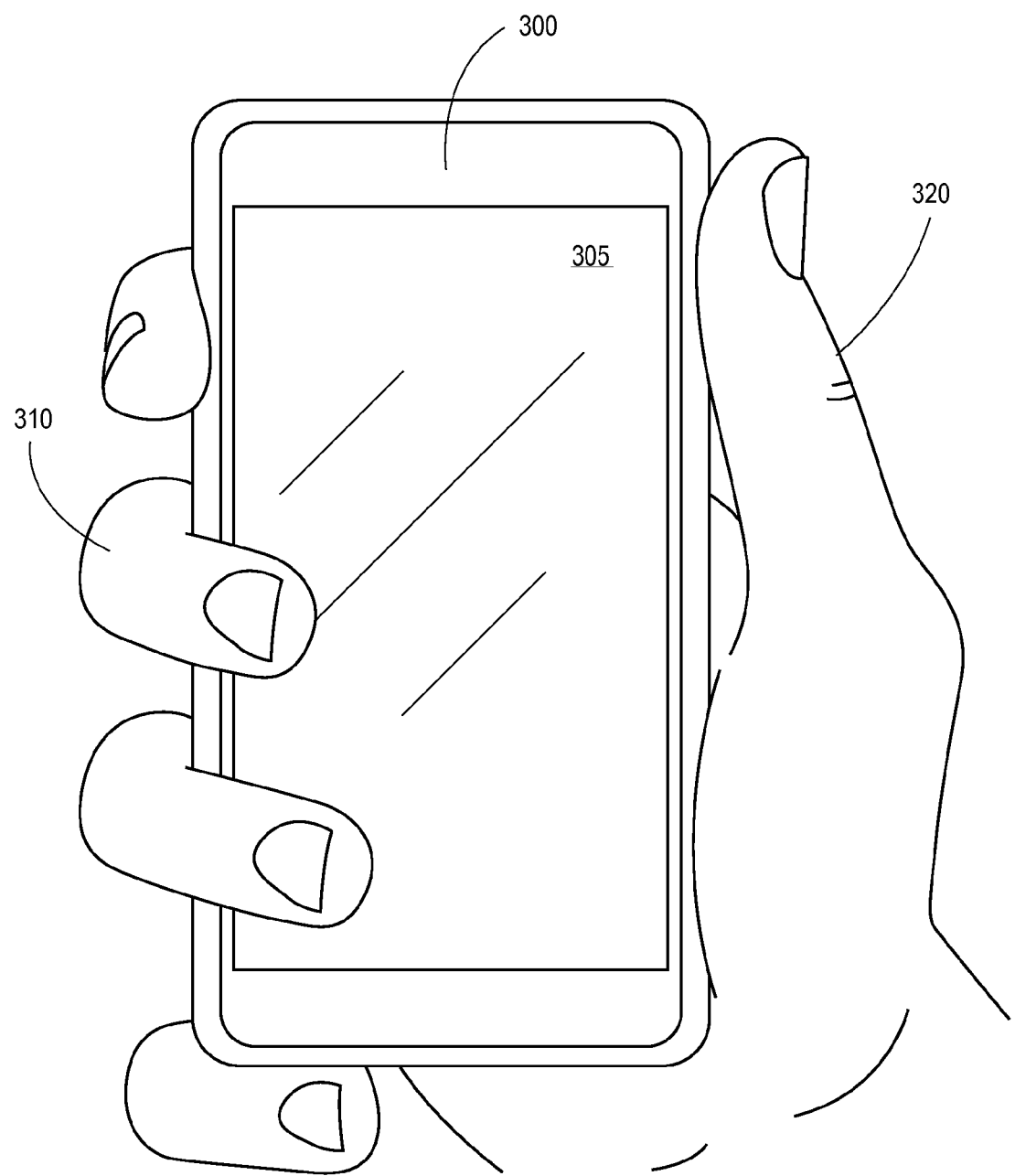
FIG. 3 illustrates high intensity gripping of an embodiment of a mobile device.

FIG. 3 illustrates high intensity gripping of an embodiment of a mobile device. In this illustration, the grip may be indicative of a user holding the mobile device tightly to provide a certain input to the mobile device. In some embodiments, a mobile device 300 including a touch screen 305 may be gripped firmly by the user, where the firm grip may include significant finger wrapping 310 on a first side of the mobile device 300 and further contact of the user's thumb and hand 320 on a second side of the mobile device 300. With this firm grip, the touch screen 305 of the mobile device 300 will detect greater contact and proximity with the user's hand, thereby providing a second level of input to the mobile device 300.

Figure 4:
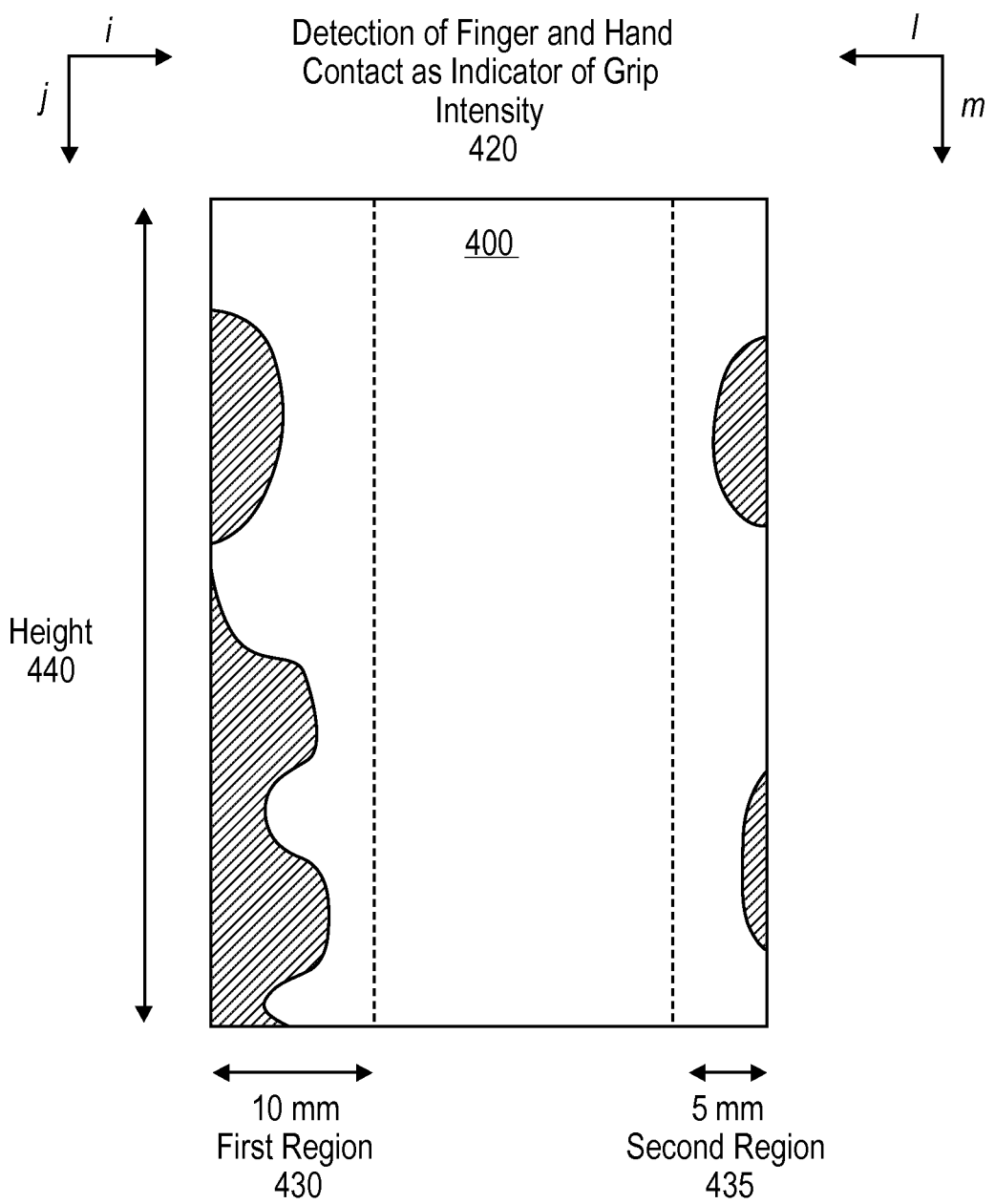
FIG. 4 illustrates a capacitive coupling screen intensity map for an embodiment of a mobile device.

FIG. 4 illustrates a capacitive coupling screen intensity map for an embodiment of a mobile device. In some embodiments, a mobile device may include a touch screen, and the touch screen may detect contact or proximity with the user's hand in certain regions of the touch screen 420. In some embodiments, a touch screen intensity map 400 of the touch screen may include a first region of interest 430 and second region of interest 435 that are indicative of certain sides of the mobile device depending on which hand is used to hold the device.

In this illustration, it is assumed that the user is holding the mobile device in the user's right hand, and thus the first region 430 is on the left side of the touch screen (shown in terms of an i-axis and a j-axis), where the first region 430 is the region that may have contact with or proximity with the finger tips of the hand of the user, with the first region being a certain width (10 mm in this example) depending on expected contact with the user's fingers. The second region 435 is the on the right side of the touch screen (shown in terms of an l-axis and an m-axis), where the second region being the region that may have contact with or proximity with the thumb and hand of the user, with the second region 435 being a certain width (5 mm in this example) depending on the expected contact and proximity of the user's thumb and hand. In some embodiments, the location of first and second regions may vary depending on which hand the user chooses to use to hold the mobile device, where the mobile device may detect which hand is holding the mobile device through contact or proximity with the touch screen or with another function of the mobile device.

In some embodiments, the mobile device may use the level of contact or proximity in the first region 430 and the second region 435, as well as the level of contact at certain positions (such as determined by a height 440 measured along the length of the touch screen) in such regions, to determine an intensity of grip by a user.

Figure 5:
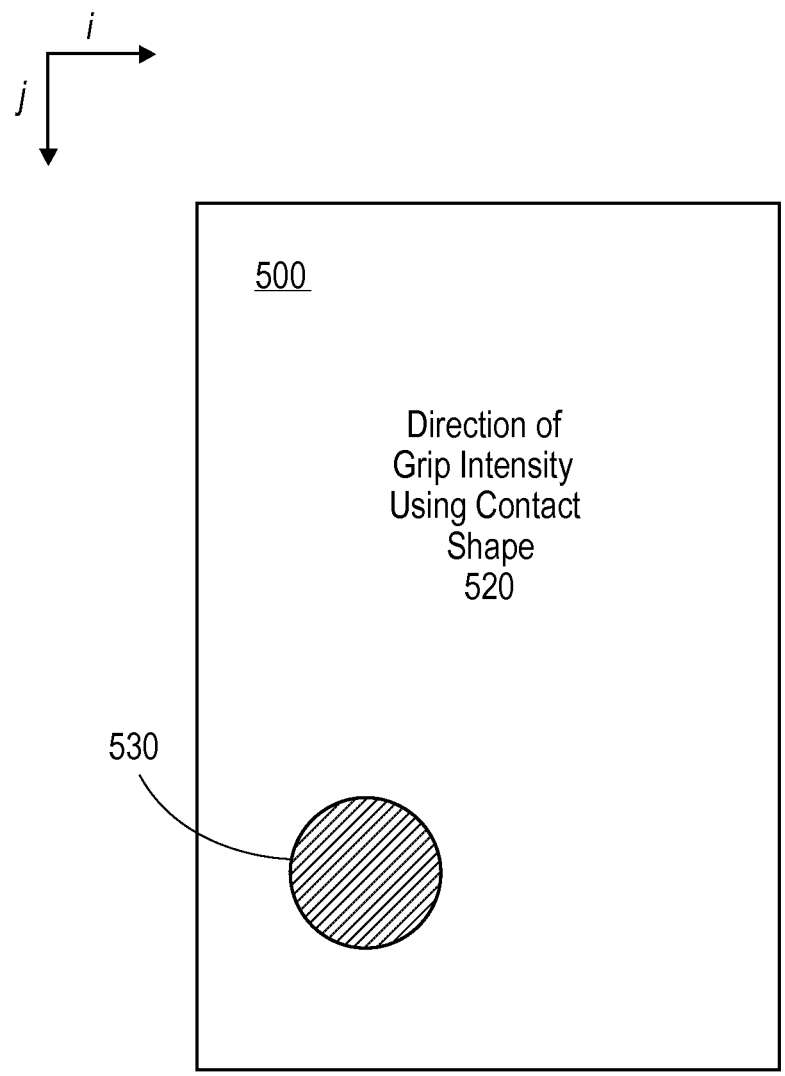
FIGS. 5 and 6 illustrate contact shapes detected by an embodiment of a mobile device in detection of grip intensity.
Figure 6:
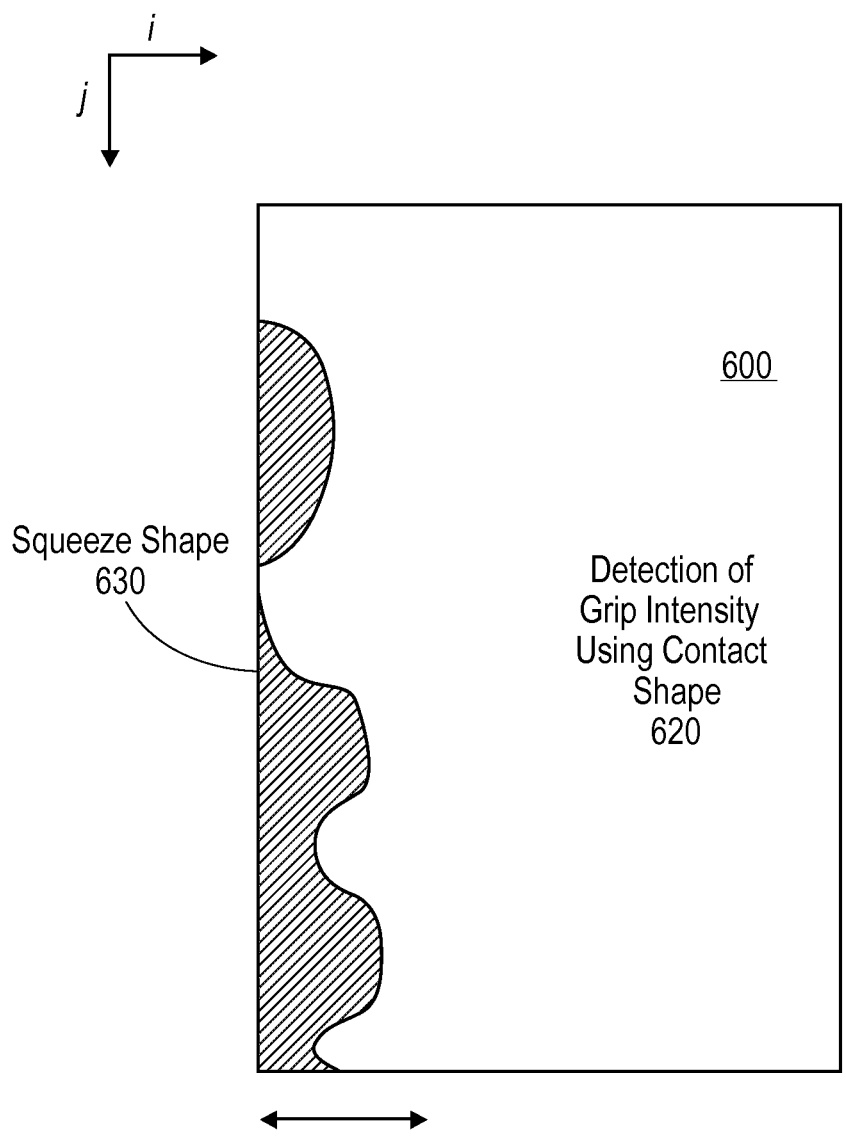

FIGS. 5 and 6 illustrate contact shapes detected by an embodiment of a mobile device in determination of grip intensity. In some embodiments, a mobile device may detect certain types of shapes of contact or proximity of a user's fingers and hand, and may utilize such detected shapes as an indicator of grip shape and firmness in the determination of an intensity of grip on the mobile device.

FIG. 5 illustrates a screen intensity map 500 of a mobile device providing determination of grip intensity that includes shape of contact areas 520. In this illustration, the screen intensity map 500 detects one or more "touch point" shapes 530, where the touch point shape 530 may be indicative of the contact or proximity of only the tip of a finger of a user. In some embodiments, the mobile device may include the detection of touch point shapes as indicators of a looser grip on the mobile device.

FIG. 6 illustrates a screen intensity map 600 of a mobile device providing determination of grip intensity that includes shape of contact areas 620. In this illustration, the screen intensity map 600 detects a "squeeze" shape 630, where the shape 630 may be indicative of the contact or proximity of the fingers of a user wrapping around the mobile device. In some embodiments, the mobile device may include the detection of squeeze shapes as indicators of a tighter grip on the mobile device as the user uses more of the fingers to apply pressure to the mobile device. While FIG. 6 provides an example of a particular shape that is indicative of a tighter/squeezing grip on the mobile device, embodiments are not limited to any particular pattern shape. The pattern shape may, for example, vary based on the size and shape of the mobile device, which thus affects how a user will hold the mobile device.

In some embodiments, the mobile device may provide for disambiguation between the touch point shape (roughly circular shape) and the squeeze shape (an elongated shape) as the shapes vary with the individual user or other factors. For example, the shapes in terms of contact along the directions of the i-axis and the j-axis within the first region 430 or the second region 435:

$$\text{Squeeze detection shape} = \sigma_i/\sigma_j \quad [1]$$

Where:

$\sigma = (\text{location Max}) - (\text{location Min})$ and where squeeze shape:

>0.5 interpreted as Touch Point

<0.5 interpreted as Squeeze Shape

While the example of Equation 1 provides a certain threshold at which shapes may be interpreted as a first type of shape or a second type of shape, embodiments are not limited to this particular process for disambiguation between contact shapes.

Figure 7:
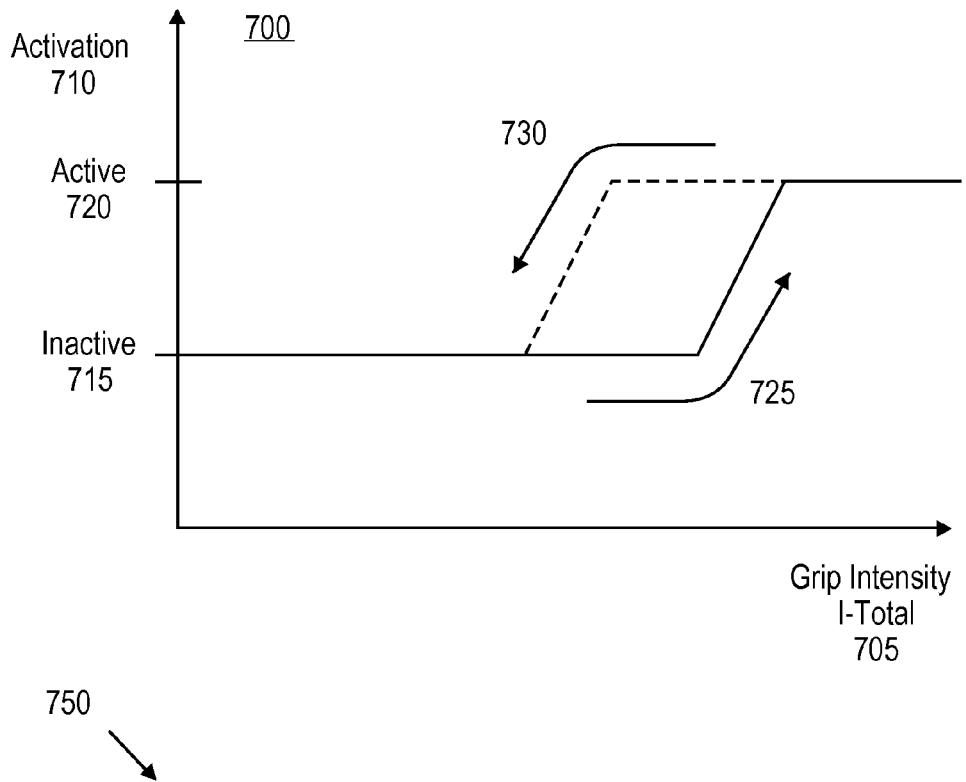
FIG. 7 illustrates activation levels for embodiments of mobile devices providing for determination of grip intensity.

FIG. 7 illustrates activation levels for embodiments of mobile devices providing for determination of grip intensity. In some embodiments, threshold throttle levels are established for onset and offset activation. In this illustration, a graph 700 illustrates Activation 710 on a first axis and detected Grip Intensity (I-Total) 705 on a second axis. In some embodiments, the activation 710 may include either an inactive state 715 or an active state 720. The active or inactive states may turn certain functions of the mobile device on or off. In one example, the grip on the mobile device may activate a scrolling function, but embodiments are not limited to this example. While only two activation states are illustrated, embodiments are not limited to these two states, and may include a greater number of activation states and different kinds types of activation states.

In some embodiments, the variations in hand position alter the throttle level of the squeeze of a mobile device by a user. For example, a loosely held mobile device (such as in FIG. 2) and a firmly held mobile device (such as in FIG. 3) may depict low to high throttle levels by a user. These levels are measures in the two regions of interest (such as regions 430 and 435 in FIG. 4) on the left and right side of a capacitive screen. The capacitive intensity on the screen is measured in these regions as the inverse of the sum of each pad's capacitive drain in the l- and j-axes and the l- and m-axes. In some embodiments, throttle level is a change in total capacitive intensity.

In some embodiments, if a grip intensity is large enough to cross an initial threshold 725, and the shape is elongated enough to suggest a 'non-fingertip' interaction, then the throttle levels are computed. The throttle levels are computed as the change in intensity given an initial starting intensity. For each time slot, the calculation is the sum of all intensities in the left and right regions of the display screen. The throttle level is then computed across consecutively sampled time slots with a single pole IIR filter 750 provided in FIG. 7. In some embodiments, when the user releases the user's grip intensity below the Inactive 'counter clockwise' path 730, then the throttle level calculation is terminated.

Once a squeeze has been detected, an interaction sequence for controlling text scrolling is as follows. A web page is used only as an example here, and this can be applied to other applications such as e-book readers.

1. A web page is loaded. The mobile device records the relative intensity of the grip as reference.

2. The user initiates auto scroll with a gesture, such as flicking the thumb on the screen, on the right edge of the screen, or on a side touch sensor. The direction of flick indicates the direction of scroll.

3. The text on the screen starts to auto-scroll, and the user may read the text.

4. To accelerate the speed of scrolling, the user intensifies the grip. The speed of scrolling increases in proportion to the intensity of the grip. In an alternate implementation, an increase in grip intensity may operate in an opposite fashion decreases the speed of scrolling.

5. The user relaxes the grip to decrease the speed of scrolling. In an alternate implementation, relaxing the grip increases the speed of scrolling.

6. Scrolling may be halted in one of many different ways, such as, for example:

a. User places a thumb on the touch screen and releases it.

b. User relaxes the grip to an intensity 730 that is lower than the reference intensity 725 recorded in Step 1.

c. User employs a gesture on a side touch sensor.

Figure 8:
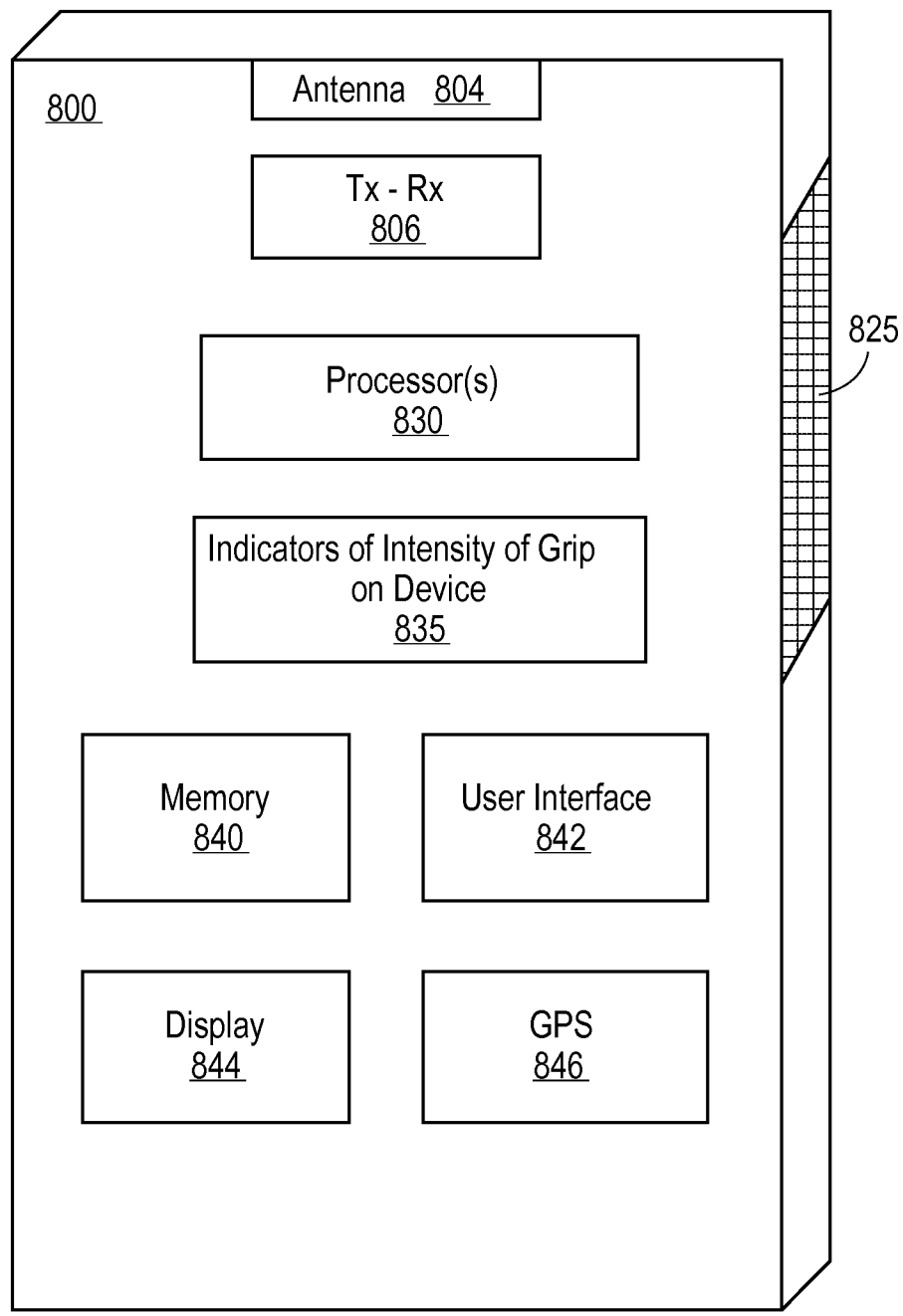
FIG. 8 is an illustration of an embodiment of elements of a mobile device that provides for detection of grip intensity.

FIG. 8 is an illustration of an embodiment of elements of a mobile device that provides for determination of grip intensity. In some embodiments, the mobile device 800 includes one or more processors 830 for the processing of signals and commands, including capacitive data resulting from a user of the device gripping the device. In some embodiments, the mobile device 800 includes indicators 835 to determine grip intensity on the mobile device, where the indicators may include the shape, size, and placement of capacitive detection of a user's hand in gripping the mobile device.

In some embodiments, the mobile device 800 may further include a side touch sensor 825 for use in providing input to the mobile device through gesture operations of a thumb or other finger of the user, including actions to commence a function controlled by grip intensity.

The mobile device may further include, for example, one or more transmitters and receivers 806 for the wireless transmission and reception of data, as well as one or more directional or omnidirectional antennas 804 for such data transmission and reception; a memory 840 for the storage of data; a user interface 842, including a graphical user interface (GUI), for communications between the mobile device 800 and a user of the device; a display circuit or controller 844 for providing a visual display to a user of the mobile device 800; and a location circuit or element, including a (GPS) circuit or element 846.

Figure 9:
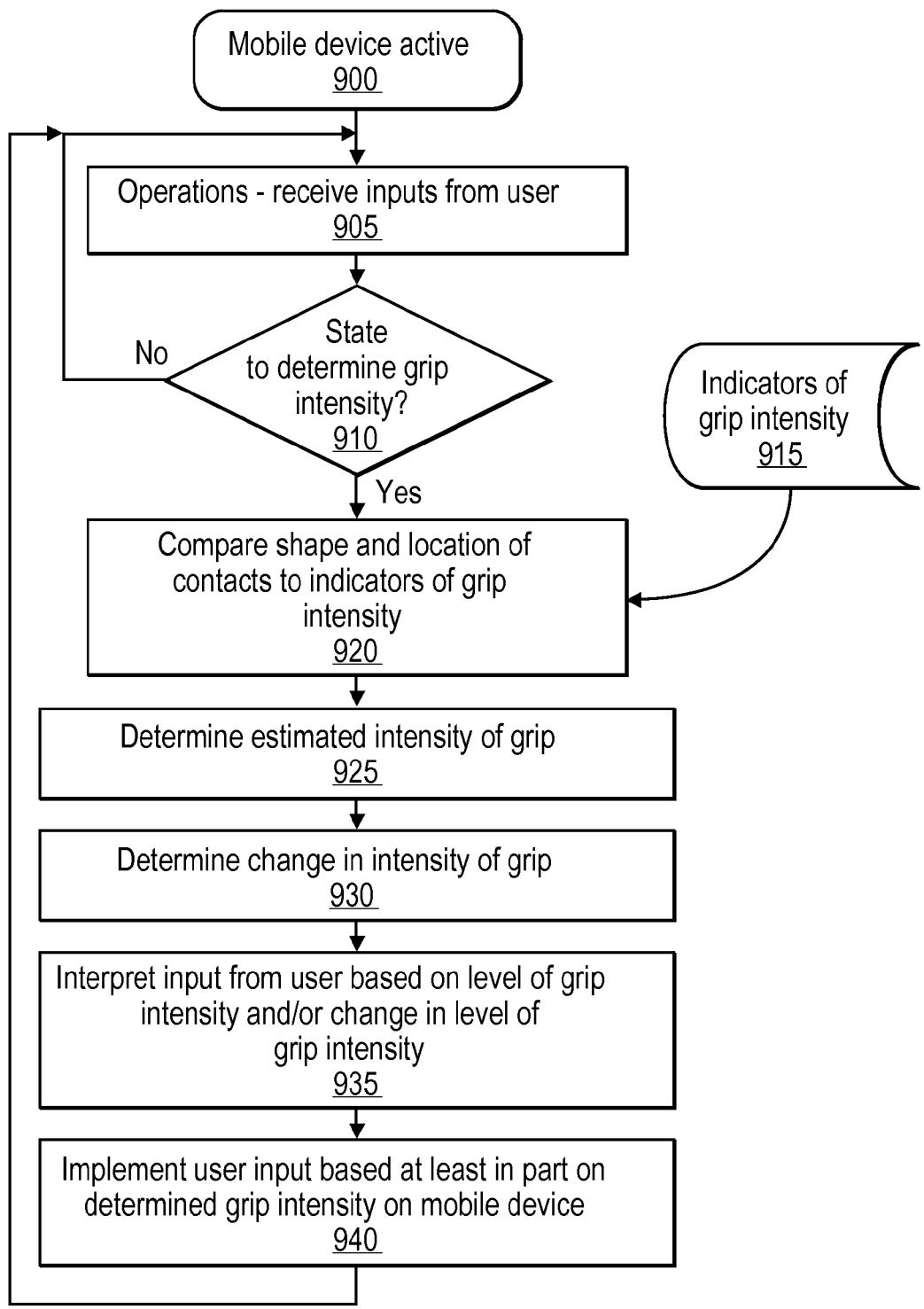
FIG. 9 is a flowchart to illustrate an embodiment of a process for determining and utilizing grip intensity.

FIG. 9 is a flowchart to illustrate an embodiment of a process for determining and utilizing grip intensity. In some embodiments, upon a mobile device becoming operational 900, the mobile device may proceed with normal operations, including receipt of sensor inputs 905, where the sensor inputs include capacitive sensing from a touch screen.

In some embodiments, if the mobile device is in a state for determining grip intensity 910, then a shape and location of contact areas for the touch screen are compared 920 with indicators of grip intensity 915, which may includes elements illustrated in FIGS. 4-6.

In some embodiments, there is a determination of an estimated intensity of grip 925. In some embodiments, there is determination of the change in intensity of grip 930, such as a measure of how much the grip intensity has increased over a baseline amount. In some embodiments, the mobile device is to interpret input from the user based on the grip intensity, the amount of change in grip intensity, or both 935, and implement input based at least in part on the grip intensity on the mobile device.

Figure 10:
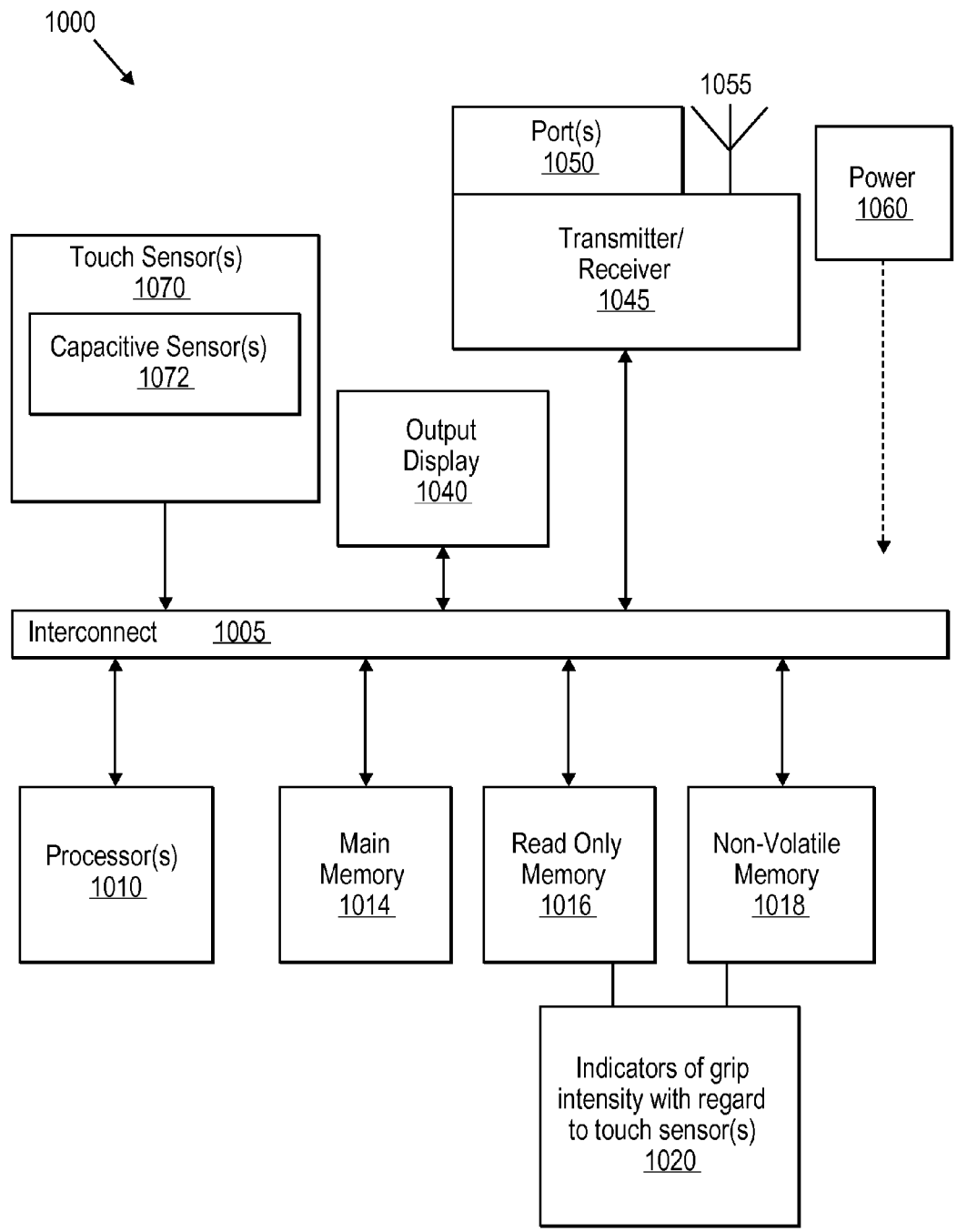
FIG. 10 illustrates an embodiment of a mobile device providing for determination of grip intensity using touch sensors.

FIG. 10 illustrates an embodiment of a mobile device providing for determination of grip intensity using touch sensors. In this illustration, certain standard and well-known components that are not germane to the present description are not shown. Under some embodiments, the mobile device 1000 comprises an interconnect or crossbar 1005 or other communication means for transmission of data. The device

1000 may include a processing means such as one or more processors 1010 coupled with the interconnect 1005 for processing information. The processors 1010 may comprise one or more physical processors and one or more logical processors. The interconnect 1005 is illustrated as a single interconnect for simplicity, but may represent multiple different interconnects or buses and the component connections to such interconnects may vary. The interconnect 1005 shown in FIG. 10 is an abstraction that represents any one or more separate physical buses, point-to-point connections, or both connected by appropriate bridges, adapters, or controllers.

In some embodiments, the device 1000 includes one or more touch sensors 1070. In some embodiments, the touch sensors 1070 may includes capacitive sensors 1072, and may include a side touch sensor, such as side touch sensor 825 as illustrated in FIG. 8. In some embodiments, the device 1000 provides for determination of grip intensity using contact or proximity with the one or more touch sensors.

In some embodiments, the device 1000 further comprises a random access memory (RAM) or other dynamic storage device or element as a main memory 1014 for storing information and instructions to be executed by the processors 1010. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may include certain registers or other special purpose memory. The device 1000 also may comprise a read only memory (ROM) 1016 or other static storage device for storing static information and instructions for the processors 1010. The device 1000 may include one or more non-volatile memory elements 1018, including flash memory, for the storage of certain elements. In some embodiments, the ROM memory 1016 or the non-volatile memory 1018 may include storage of data regarding indicators of grip intensity with regard to touch sensors 1020 for use in determining and interpreting input from a user of the device 1000 through variation in grip intensity.

The device 1000 may also be coupled via the interconnect 1005 to an output display 1040. In some embodiments, the display 1040 may include a liquid crystal display (LCD) or any other display technology, for displaying information or content to a user. In some environments, the display 1040 may include a touch-screen that is also utilized as at least a part of an input device. In some environments, the display 1040 may be or may include an audio device, such as a speaker for providing audio information.

One or more transmitters or receivers 1045 may also be coupled to the interconnect 1005. In some embodiments, the device 1000 may include one or more ports 1050 for the reception or transmission of data. The device 1000 may further include one or more directional or omnidirectional antennas 1055 for the reception of data via radio signals.

The device 1000 may also comprise a power device or system 1060, which may comprise a power supply, a battery, a solar cell, a fuel cell, or other system or device for providing or generating power. The power provided by the power device or system 1060 may be distributed as required to elements of the device 1000.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a non-transitory computer-readable storage medium having stored thereon computer program instructions, which may be used to program a computer (or other electronic devices) for execution by one or more processors to perform a process according to certain embodiments. The computer-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A mobile device comprising:
   a touch sensor to detect contact or proximity by a user of the mobile device, the touch sensor being a capacitive touch screen for the mobile device;
   a memory to store indicators of grip shape and firmness for contact that is detected by the capacitive touch screen, the indicators of grip shape and firmness including data regarding contact shapes for the capacitive touch screen for varying levels of grip intensity; and
   a processor to evaluate contact to the capacitive touch screen;
   wherein the processor is to:
      compare a contact that is detected by the capacitive touch screen to the indicators of grip shape and firmness for the capacitive touch screen, and
      determine a level of grip intensity on the mobile device, wherein the determination of the level of grip intensity is based on the comparison between the contact that is detected by the capacitive touch screen and the indicators of grip shape and firmness for the capacitive touch screen; and
   wherein the mobile device is to receive an input for a function of the mobile device based at least in part on the determined level of grip intensity on the mobile device.

2. The mobile device of claim 1, wherein the data regarding contact shapes includes data describing a shape of a hand supporting the mobile device in a resting position.

3. The mobile device of claim 1, wherein the function is a scrolling function of the mobile device for scrolling displayed data.

4. The mobile device of claim 3, wherein a speed of the scrolling of displayed data is to be modified based on the determined level of grip intensity on the mobile device.

5. The mobile device of claim 4, wherein the speed of scrolling increases in proportion to the level of grip intensity.

6. The mobile device of claim 1, wherein the input for the function of the mobile device is a request for the activation and deactivation of the function based on the determined level of grip intensity on the mobile device.

7. The mobile device of claim 6, wherein the input includes a first squeeze of the mobile device to activate the function and a second squeeze of the mobile device to deactivate the function.

8. The mobile device of claim 1, wherein the determined level of grip intensity is one of a first level of grip intensity for a loose grip on the mobile device and a second level of grip intensity for a firm grip on the mobile device, the first level of grip intensity being less than the second level of grip intensity.

9. The mobile device of claim 1, wherein the mobile device does not include a sensor to directly detect grip intensity.

10. The mobile device of claim 1, wherein determining a level of grip intensity further includes determining a change in grip intensity compared to an initial grip intensity.

11. A method comprising:
    receiving data regarding contact that is detected by a touch sensor of a mobile device by a user of the mobile device, the touch sensor being a capacitive touch screen for the mobile device;
    comparing the data regarding the touch sensor to indicators of grip shape and firmness for contact that is detected by the capacitive touch screen, the indicators of grip shape and firmness including data regarding contact shapes for the capacitive touch screen for varying levels of grip intensity;
    determining a level of grip intensity on the mobile device, wherein the determination of the level of grip intensity is based on the comparison between the contact detected by the capacitive touch screen and the indicators of grip shape and firmness for the capacitive touch screen; and
    receiving an input for a function of the mobile device based at least in part on the determined level of grip intensity on the mobile device.

12. The method of claim 11, wherein the data regarding contact shapes includes data describing a shape of a hand supporting the mobile device in a resting position.

13. The method of claim 11, wherein the function is a scrolling function of the mobile device for scrolling displayed data.

14. The method of claim 13, further comprising modifying a speed of the scrolling of displayed data based on the determined level of grip intensity on the mobile device.

15. A system comprising:
    a transmitter to transmit data and a receiver to receive data;
    an omnidirectional antenna for data transmission, data reception, or both;
    a processor to process data for the system;
    a capacitive touch screen including a touch sensor to detect contact or proximity by a user of the system; and
    a memory to store data for the system, the data including indicators of grip shape and firmness for contact that is detected by the capacitive touch screen to determine a level of grip intensity in relation to the capacitive touch screen, the indicators of grip shape and firmness including data regarding contact shapes for the capacitive touch screen for varying levels of grip intensity;
    wherein the processor is to:
       compare a contact that is detected by the capacitive touch screen to the indicators of grip shape and firmness for the capacitive touch screen, and
       determine a level of grip intensity on the system, wherein the determination of the level of grip intensity is based based on the comparison between the contact detected by the capacitive touch screen and the indicators of grip shape and firmness for the capacitive touch screen; and
    wherein the system is to receive an input for a function of the system based at least in part on the determined level of grip intensity on the system.

16. The system of claim 15, wherein the data regarding contact shape includes data describing a shape of a hand supporting the system in a resting position.

17. The system of claim 15, wherein the function is a scrolling function of the system for controlling scrolling of displayed data on the capacitive touch screen.

18. The system of claim 17, wherein a speed of the scrolling of displayed data is to be modified based on the determined level of grip intensity on the system.

19. The system of claim 15, wherein the input for the function of the system is a request for the activation and deactivation of the function based on the determined level of grip intensity on the system.

20. A non-transitory computer-readable storage medium having stored thereon data representing sequences of instructions that, when executed by a processor, cause the processor to perform operations comprising:

receiving data regarding contact that is detected by a touch sensor of a mobile device by a user of the mobile device, the touch sensor being a capacitive touch screen for the mobile device;

comparing the data regarding the capacitive touch screen to indicators regarding grip shape and firmness for contact that is detected by the capacitive touch screen, the indicators of grip shape and firmness including data regarding contact shapes for the capacitive touch screen for varying levels of grip intensity;

determining a level of grip intensity on the mobile device, wherein the determination of the level of grip intensity is based on the comparison between the contact detected by the capacitive touch screen and the indicators of grip shape and firmness for the capacitive touch screen; and receiving an input for a function of the mobile device based at least in part on the determined level of grip intensity on the mobile device.

21. The medium of claim 20, wherein the data regarding contact shapes includes data describing a shape of a hand supporting the mobile device.

22. The medium of claim 20, wherein the function is a scrolling function of the mobile device for scrolling displayed data.

* * * * *

UNITED STATES PATENT AND TRADEMARK OFFICE
CERTIFICATE OF CORRECTION

PATENT NO. : 9,541,993 B2  
APPLICATION NO. : 13/997160  
DATED : January 10, 2017  
INVENTOR(S) : Balasundaram et al.

It is certified that error appears in the above-identified patent and that said Letters Patent is hereby corrected as shown below:

In the Claims

In Column 10, at Line 61, delete the second occurrence of "based".

Signed and Sealed this
Twenty-first Day of March, 2017

Michelle K. Lee
*Director of the United States Patent and Trademark Office*